US012749848B2

(12) United States Patent
Lee et al.

(10) Patent No.: US 12,749,848 B2
(45) Date of Patent: Sep. 29, 2026

(54) SELF-ALIGNING MAGNETICALLY COUPLED CONNECTOR

(71) Applicant: BROADATA COMMUNICATIONS, INC., Torrance, CA (US)

(72) Inventors: Kang Lee, Huntington Beach, CA (US); Robert Waldo, Palos Verdes Estates (CA); Andrew Kostrzewski, Garden Grove, CA (US); Jimmy Banda, Lakewood, CA (US); Duke Tran, Buena Park, CA (US); Brian Taylor Avchen, Beverly Hills, CA (US)

(73) Assignee: BROADATA COMMUNICATIONS, INC., Torrance, CA (US)

( * ) Notice: Subject to any disclaimer, the term of this patent is extended or adjusted under 35 U.S.C. 154(b) by 265 days.

(21) Appl. No.: 18/610,607

(22) Filed: Mar. 20, 2024

(65) Prior Publication Data

US 2024/0322485 A1 Sep. 26, 2024

Related U.S. Application Data

(60) Provisional application No. 63/453,416, filed on Mar. 20, 2023.

(51) Int. Cl.
*H01R 13/62* (2006.01)
*H01R 13/24* (2006.01)

(52) U.S. Cl.
CPC ..... *H01R 13/6205* (2013.01); *H01R 13/2407* (2013.01)

(58) Field of Classification Search
CPC ........................ H01R 13/6205; H01R 13/2407
(Continued)

(56) References Cited

U.S. PATENT DOCUMENTS 3,786,391 A * 1/1974 Mathauser ......... H01R 13/6205 439/246
3,808,577 A * 4/1974 Mathauser ......... H01R 13/6205 439/246

(Continued)

FOREIGN PATENT DOCUMENTS

CN 210272861 U 4/2020

*Primary Examiner* — Tulsidas C Patel
*Assistant Examiner* — Jeffrey Mountain
(74) *Attorney, Agent, or Firm* — Sheppard, Mullin, Richter & Hampton LLP

(57) ABSTRACT

A self-aligning connector may include an outer connector body and an inner connector body rotatably mounted within the outer connector body. The self-aligning connector may include a plurality of electrical contacts arranged on a face of the inner connector body and a plurality of magnets arranged in a determined pattern on the face of the inner connector body. The self-aligning connector may be configured such that when mating to a corresponding connector that may include a corresponding plurality of magnets in a determined pattern on its face, attractive and repulsive forces of the magnets on the face of the inner connector body and the face of the corresponding connector cause the inner connector body to rotate within the outer connector body to an orientation that aligns the electrical contacts on the face of the inner connector body with corresponding electrical contacts on the face of the corresponding connector.

20 Claims, 9 Drawing Sheets

(58) Field of Classification Search
USPC ............ 439/38, 39, 246, 247, 248, 249, 251
See application file for complete search history.

(56) References Cited

U.S. PATENT DOCUMENTS

| | | | | |
|---|---|---|---|---|
| 3,810,258 | A * | 5/1974 | Mathauser | H01R 13/6205 439/246 |
| 8,187,006 | B2 | 5/2012 | Rudisill et al. | |
| 10,027,057 | B2 | 7/2018 | Szeto et al. | |
| 10,411,419 | B2 | 9/2019 | You | |
| 11,791,590 | B2 * | 10/2023 | Klein | H01R 13/701 439/39 |
| 2017/0162980 | A1 | 6/2017 | Szeto et al. | |
| 2017/0346220 | A1 | 11/2017 | Szeto et al. | |
| 2018/0277998 | A1 | 9/2018 | You | |
| 2021/0311263 | A1 * | 10/2021 | Day | G02B 6/3572 |
| 2022/0294156 | A1 * | 9/2022 | Whear | H01R 13/5219 |

* cited by examiner

SELF-ALIGNING MAGNETICALLY COUPLED CONNECTOR

REFERENCE TO RELATED APPLICATION

The present application claims the benefit of and priority to U.S. Patent Provisional Application No. 63/453,416, filed Mar. 20, 2023 and titled "SELF-ALIGNING MAGNETICALLY COUPLED CONNECTOR," which is incorporated herein by reference in its entirety.

TECHNICAL FIELD

The disclosed technology relates generally to electrical connectors, and more particularly, some embodiments relate to self-aligning magnetically capable electrical connectors.

DESCRIPTION OF RELATED ART

Magnetic electrical connectors are a type of electrical connector that use magnets to connect the two connector body portions. One advantage of magnetic connectors is that they can eliminate the need for mechanical fasteners or latches, making them easy to connect and disconnect.

Magnetic electrical connectors come in various shapes and sizes and are used in a wide range of applications, including consumer electronics, medical devices, government and military applications, and industrial equipment and others. They typically include a ferromagnetic material to make a magnetic connection.

Such connectors may use a magnet to snap the power cord into place, ensuring a secure connection while also allowing for easy detachment in case of accidental tripping or pulling. This can avoid damage to sensitive or expensive (and even dangerous) equipment by disconnecting the cable rather than by toppling or dislodging the equipment. Another example is the magnetic charging cable used in some wireless headphones, where the cable snaps onto the earbuds magnetically, allowing for effortless charging.

Overall, magnetic electrical connectors provide a convenient and efficient solution for connecting and disconnecting conductive elements without the need for mechanical fasteners, making them an increasingly popular choice in various industries.

BRIEF DESCRIPTION OF THE DRAWINGS

The technology disclosed herein, in accordance with one or more various embodiments, is described in detail with reference to the included figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
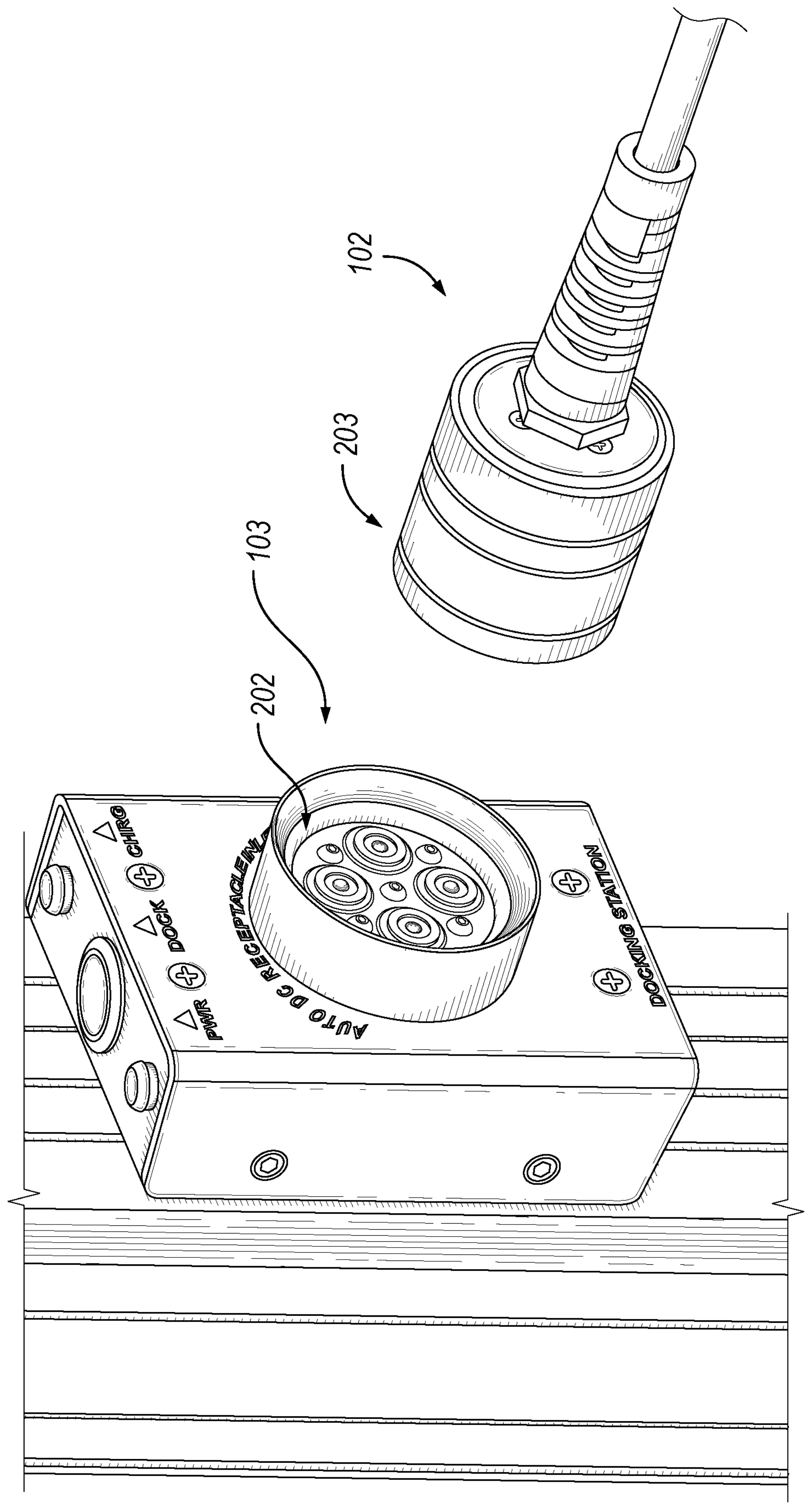
FIG. 1 illustrates an example magnetically symmetrically couplable magnetic connector in accordance with various embodiments.

Some of the figures included herein illustrate various embodiments of the disclosed technology from different viewing angles. Although the accompanying descriptive text may refer to such views as "top," "bottom" or "side" views, such references are merely descriptive and do not imply or require that the disclosed technology be implemented or used in a particular spatial orientation unless explicitly stated otherwise.

The figures are not exhaustive and do not limit the disclosure or the disclosed embodiments to the precise form disclosed.

DETAILED DESCRIPTION

Embodiments of the technology disclosed herein are directed toward devices and methods for providing electrical connections, such as electrical connections for power and data transfer as an example. More particularly, various embodiments of the technology disclosed herein relate to electrical connectors that use magnetic materials to facilitate magnetic connection between two corresponding connector halves or bodies. Certain embodiments may employ symmetrical configurations to allow ease of connectivity without requiring mechanical/physical keying devices. Certain embodiments may use different polarity magnets arranged in a determined configuration to facilitate automatic connector alignment (e.g., self-alignment) during mating.

Connectors according to the systems and methods described herein may be used in any of a number of different electrical connector types. Electrical connectors usually include a pair of connector bodies, each containing electrical pins or leads, that mate together to make electrical contact. Electrical connector bodies are physical structures or housings that contain the contacts or terminals (sometimes referred to as pins or leads) of an electrical connector. The connector bodies are designed to provide mechanical support, protection, and reliable electrical connection between mating connectors.

Connector bodies can be made from a variety of materials, including for example, plastics, metals, phenolics, resins and other materials and composites. They can be molded, machined or otherwise fabricated, and they may be designed with a variety of shapes and sizes. Connector bodies may be designed with specific features, such as locking mechanisms to ensure secure mating, environmental seals to protect against moisture and the environment, and polarization features to ensure proper alignment between mating contacts within the connector bodies.

With many connectors, physical structures, sometimes referred to as keys, may be used to ensure proper alignment and polarization when mating connector bodies. Physical structures such as latches may also be included to secure the two connector bodies together formatting. This may include a latch mechanism on one connector that engages with a corresponding physical feature on the other connector. The latch may include, for example, a spring tab that grasps onto the other connector. Various connector configurations may include push pull latches, screw locks, bayonet locks and slide locks.

Embodiments of the systems and methods disclosed herein may utilize magnetic latches in place of or in addition to physical latch mechanisms such as those described above. Embodiments may utilize a plurality of magnets arranged in a determined pattern on one connector body, wherein the pattern is configured to align with a corresponding pattern on the mating connector body. With the magnets, when the connector bodies are brought into close proximity with one another, the magnetic attraction of the corresponding magnets in each connector body pull the connectors together to mechanically attach the connectors for electrical connection.

Embodiments may utilize a particular pattern of magnets with determined polarities arranged about the connector body for alignment purposes. For example, a plurality of magnets can be arranged on one connector body in a determined pattern of north and south polarities. A corresponding configuration of opposite polarities can be arranged in the same pattern on second connector body. The north-south attraction of the magnets in each connector body will draw the bodies together for mechanical and electrical coupling. The particular pattern of polarities can be chosen such that they draw the connector bodies together in the proper alignment/orientation such that the appropriate electrical connectors align with one another. This can be done in addition to or in place of physical keying or alignment arrangements to allow proper connector alignment through the use of a pattern of magnetic polarities.

For example, some embodiments may use an alternating arrangement of north and south poles organized in a determined pattern in one body, with the corresponding 'opposite' arrangement of north and south poles in the other body. This allows the connector to spin or twist into the proper, aligned orientation for mating. Using an alternating pattern of magnetic poles can avoid male-to-male or female to-female engagement of the pins. This can allow embodiments to implement gender-neutral contacts such that the contacts can be identical or similar to one another on each body of the connector. The contacts can be aligned by the magnetic pattern so that gender-based contacts are not required (but may still be used). Spring loaded contacts can supply addition electrical coupling integrity.

The connector bodies can be implemented such that there is an inner portion and an outer portion. The inner portion houses the contacts or terminals for electrical connection. The outer portion can be gripped by the user for mating. The connector body may be configured such that the inner portion can rotate within the outer portion such that the contacts can align by magnetic attraction of the pattern of magnets without the user having to twist their hand for alignment during connection. Alignment can occur automatically in various embodiments, without the user having to worry about alignment. Other embodiments may be implemented in which the inner and outer portions are constrained (the portions don't rotate relative to one another, or there is limited rotation) to allow for haptic feedback during mating and on mating. Embodiments may be implemented to allow proper pin-to-pin contact while allowing for 360° (at least) mating rotation.

In some embodiments, permanent magnets are utilized to provide the magnetic connection. In other embodiments, one or more of the magnets are electromagnets that can be controlled in order to control the force and sequence of connector engagement. For example, the pins in either or both mating connector bodies can be movable in the axial direction relative to the body within which they are housed. They may be configured to move individually or in sets or all together as one, such that they can engage their counterpart pins in the mating connector individually or in sets or all together. Their movement can be controlled using magnets. For example, controllable magnets, such as electromagnets can be used. A magnet or magnets surrounding or otherwise proximate each pin (or a set of pins) can be selectively energized to selectively draw that pin (or set) into a mating configuration with its corresponding pin (or set) in the other body. That corresponding pin (or set of pins) may also have a magnet or magnets proximate thereto (e.g., surrounding) which may be similarly energized (but at an opposite polarity) at a determined time to attract the magnet(s) corresponding to the first pin, thereby drawing the pins into mating configuration.

FIG. 1 illustrates an example magnetically symmetrically couplable magnetic connector in accordance with various embodiments. This example connector includes a female connector body 103 and a male connector body 104 that can be mated to one another. Although these connector bodies are round in this example, other embodiments may be implemented with connector bodies having different shapes and sizes. Similarly, although female connector body 103 is mounted to a physical structure, either or both connectors may be mounted to a structure or both may be free.

In this example, circular groove 202 surrounding an inner body portion of connector 103 is provided and dimensioned to accept outer sleeve 203 male connector body 102. The inner surface of the outer sleeve of male connector body 103 can be beveled or tapered to guide outer sleeve 203 of male connector body 103 for axial alignment. As described herein, the pattern of magnets can provide rotational alignment for proper alignment of the contacts.

Figure 2:
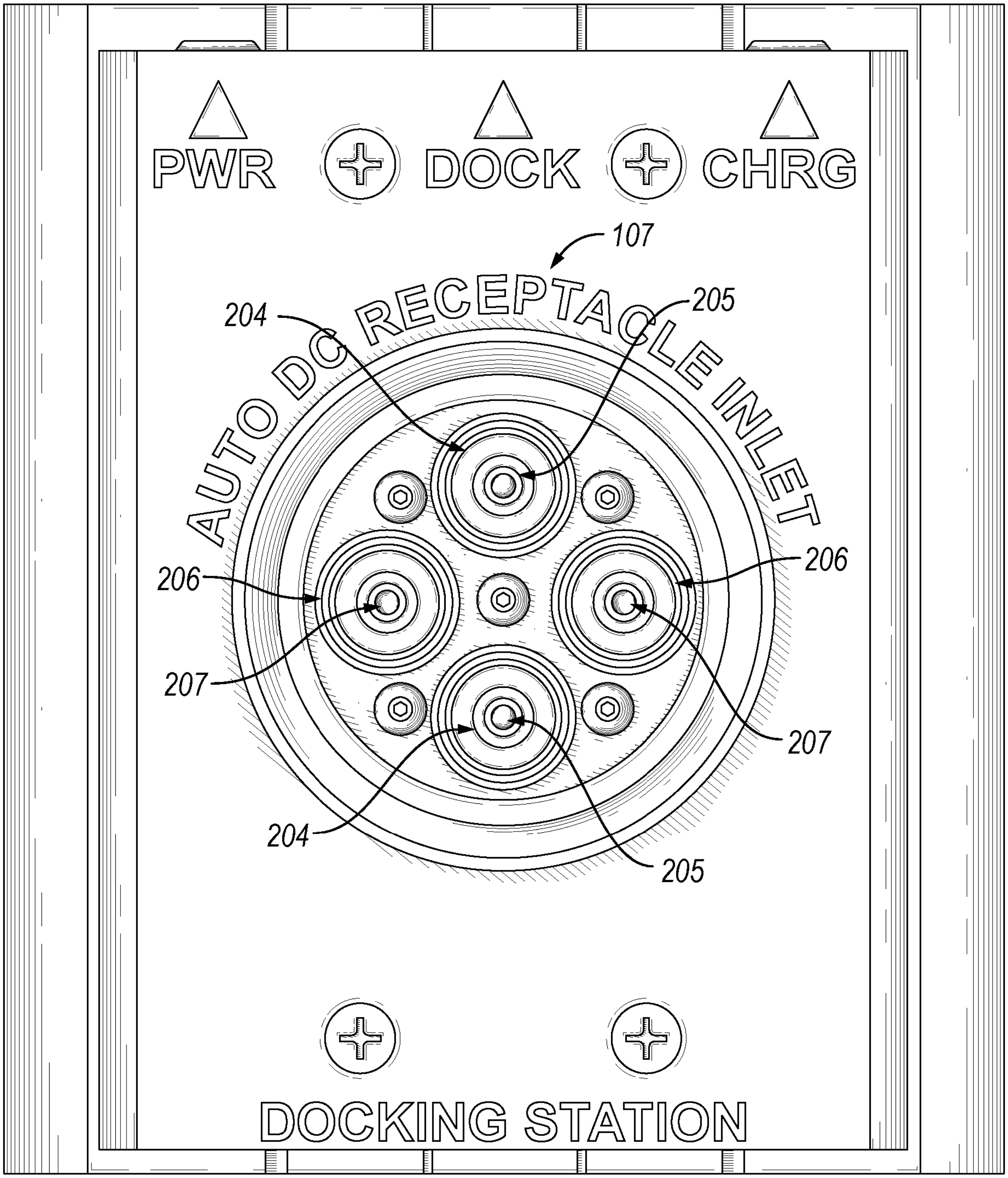
FIG. 2 illustrates one example configuration of pins and magnets of the example female connector in accordance with various embodiments.

The illustrated example connectors include a localized array of contacts and magnets. FIG. 2 illustrates one example configuration of pins and magnets of the example female connector 103 in accordance with various embodiments. In this example, a plurality of first pins 205 and second pins 207 are arranged symmetrically about the face of an inner body portion 107 of female connector 103. Cylindrically shaped magnets 204 having a first polarity (e.g. north) are disposed within this inner body portion 107 surrounding their corresponding first pins 205. Similarly, cylindrically shaped magnets 206 having a second polarity (e.g., south) are disposed within this inner body portion surrounding their corresponding second pins 207. In some embodiments, the magnets 204, 206 are marked to denote their polarity, but this need not be done in practice.

As seen in this example, pins 205 have a convex surface and pins 207 have a concave surface. In such embodiments, it is desirable to have complementary surface shapes for the corresponding pins on the male connector to which these pins mate. Such shaping can be provided to increase the contact surface of the pins and to improve the overall contact integrity. As noted above, the pins and magnets can also be spring-loaded or otherwise allowed to move axially to more firmly engage their corresponding pins and magnets in the corresponding mating connector. Although pins 205 and pins 207 are shown as having different surfaces (convex and concave, respectively) they can both have the same surface configuration (e.g., flat).

Figure 3:
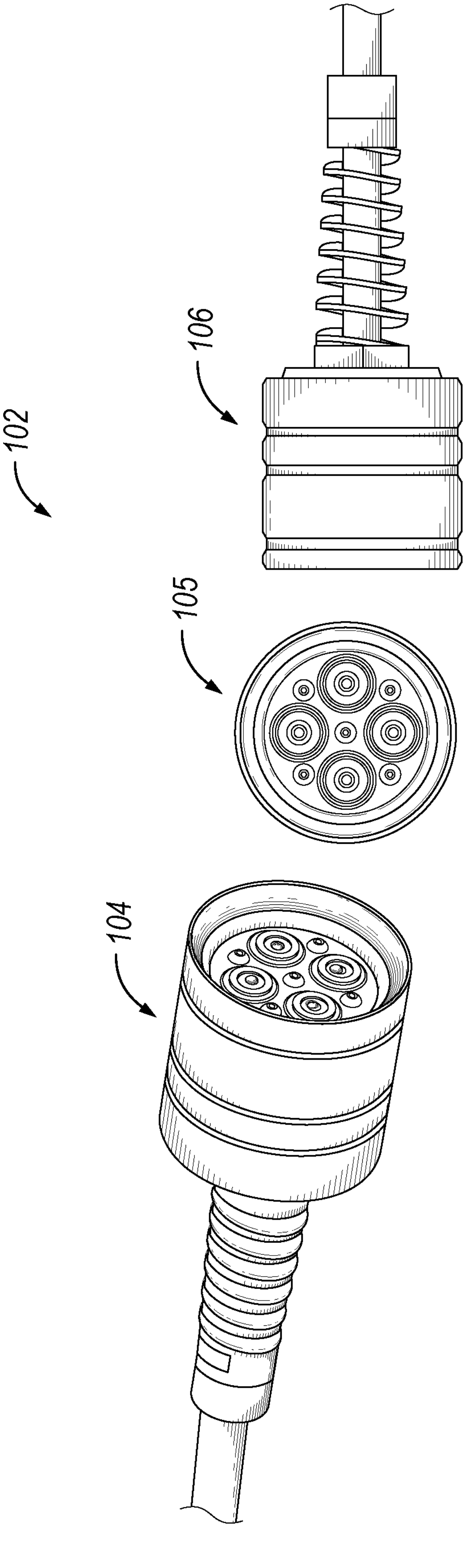
FIG. 3 illustrates three views of the example male localized magnetic array connector illustrated in the example of FIG. 1.

FIG. 3 illustrates three views of the example male localized magnetic array connector 102 illustrated in the example of FIG. 1. Illustrated are an isometric view, a front view and a side view. In various embodiments, outer body 104 can be configured to rotate freely about inner body 106 to allow proper magnetic alignment of the contacts without the user having to mechanically orient the connector with their hand.

The pin and magnet configuration on inner body portion 105 may include concave and convex connector pins each surrounded by a magnet of the determine polarity (north or south). This is similar to the arrangement shown in FIG. 2, but reference numbers are omitted in FIG. 3 for clarity of illustration. As shown, convex pins in inner body portion 105 are surrounded by magnets with a north polarity, and concave pins in inner body portion 105 are surrounded by magnets with a south polarity. Upon mating, magnets with a north polarity in one inner body are attracted to and thereby align with magnets with a south polarity in the other inner body such that the corresponding electrical contacts in each inner body portion can mate. As noted, inner body portion 105 can rotate freely within the connector housing in some embodiments such that the alignment based on attraction of the opposite magnetic poles can occur automatically, without the user having check for alignment or to rotate his or her hand to make the alignment. This can make for easier and quicker connections in some applications. This can be especially useful in certain applications, including in medical device applications, where healthcare practitioners have to activate equipment quickly and would benefit from time saved by not having to painstakingly align a connector for connection.

Figure 4:
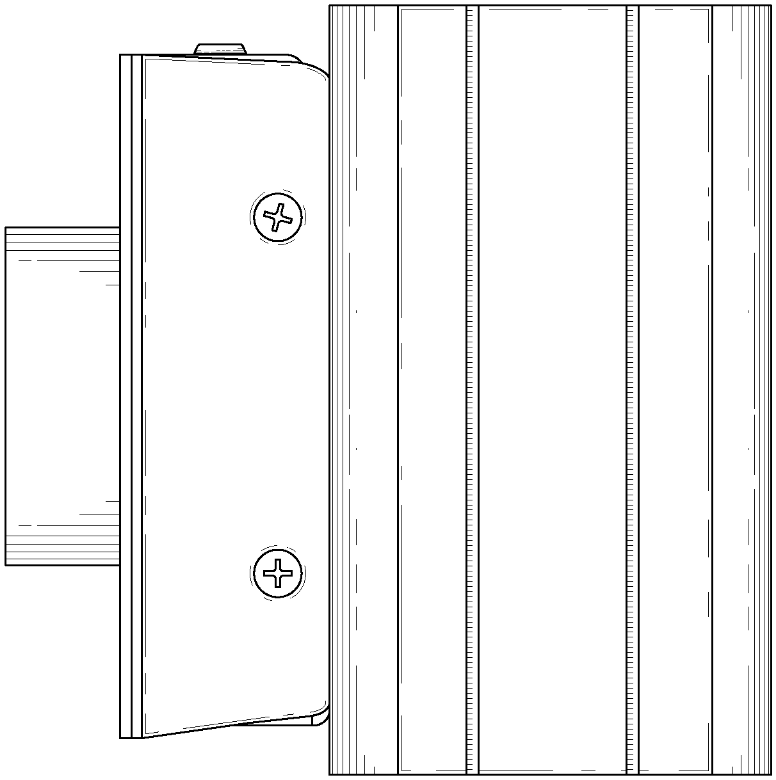
FIG. 4 illustrates a side view of the female connector mounted to a structure in accordance with various embodiments.

FIG. 4 illustrates a side view of the female connector mounted to a structure in accordance with various embodiments.

Figure 5:
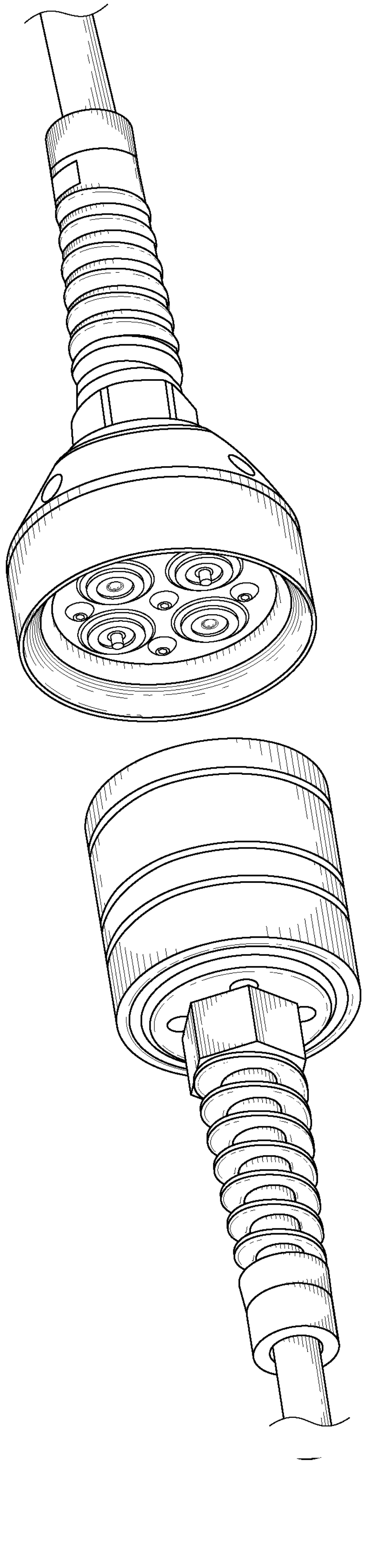
FIG. 5 illustrates an isometric view of a magnetically coupling, self-aligning connector in accordance with various embodiments.
Figure 6:
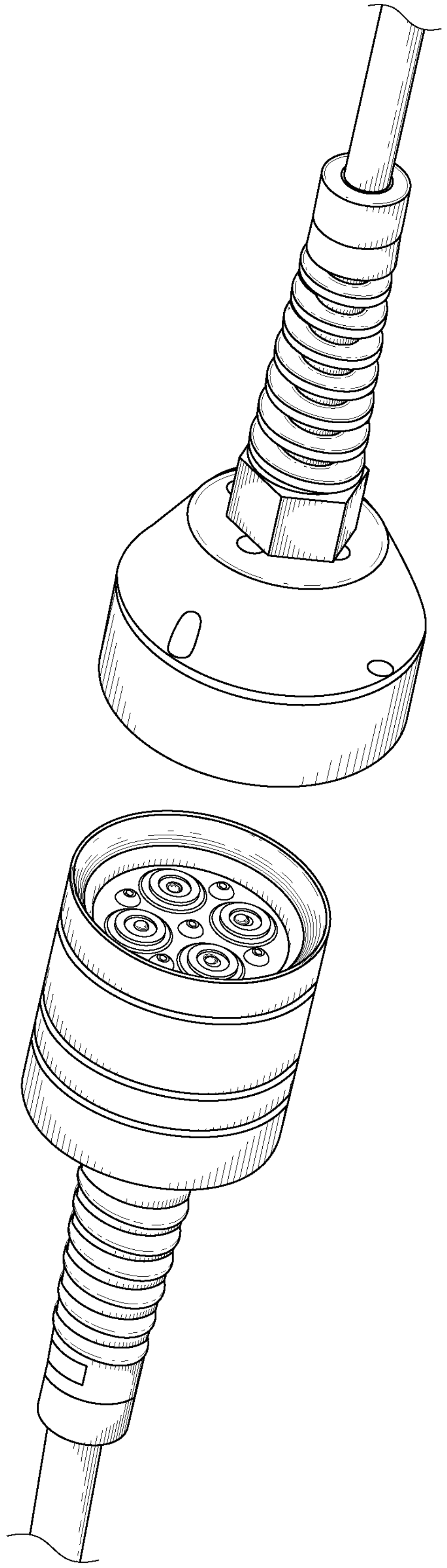
FIG. 6 illustrates another isometric view of the example magnetically coupling, self-aligning connector of FIG. 5 in accordance with various embodiments.
Figure 7:
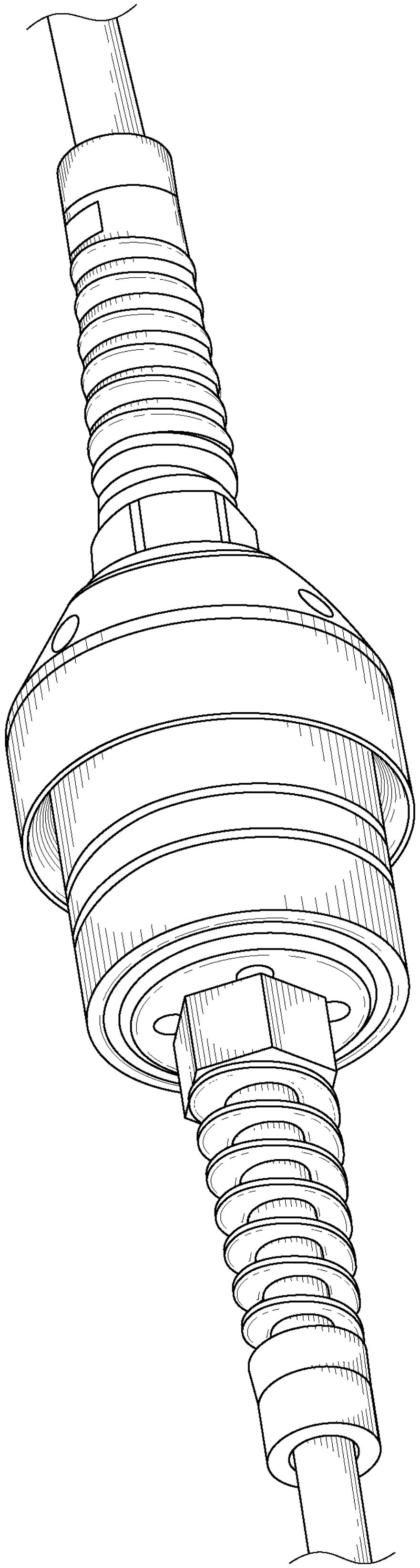
FIG. 7 illustrates the connector halves of the example magnetically coupling, self-aligning connector of FIGS. 5 and 6 in a mated configuration.

FIGS. 5, 6 and 7 illustrate isometric views of a magnetically coupling, self-aligning connector in accordance with various embodiments. In this configuration, where neither connector body is wall or equipment mounted, the connectors can be used in an extension cord or implementation. FIGS. 5 and 6 show male and female connector bodies in an unmated state with the inner body portion and its associated pins and magnets visible in the various views. A circular slot or groove between the inner body portion and the outer body portion of the female connector (similar to groove 202 in FIG. 1) can be included to accommodate the outer body sleeve portion of the male connector. FIG. 7 illustrates the connector halves in a mated configuration.

Figure 8:
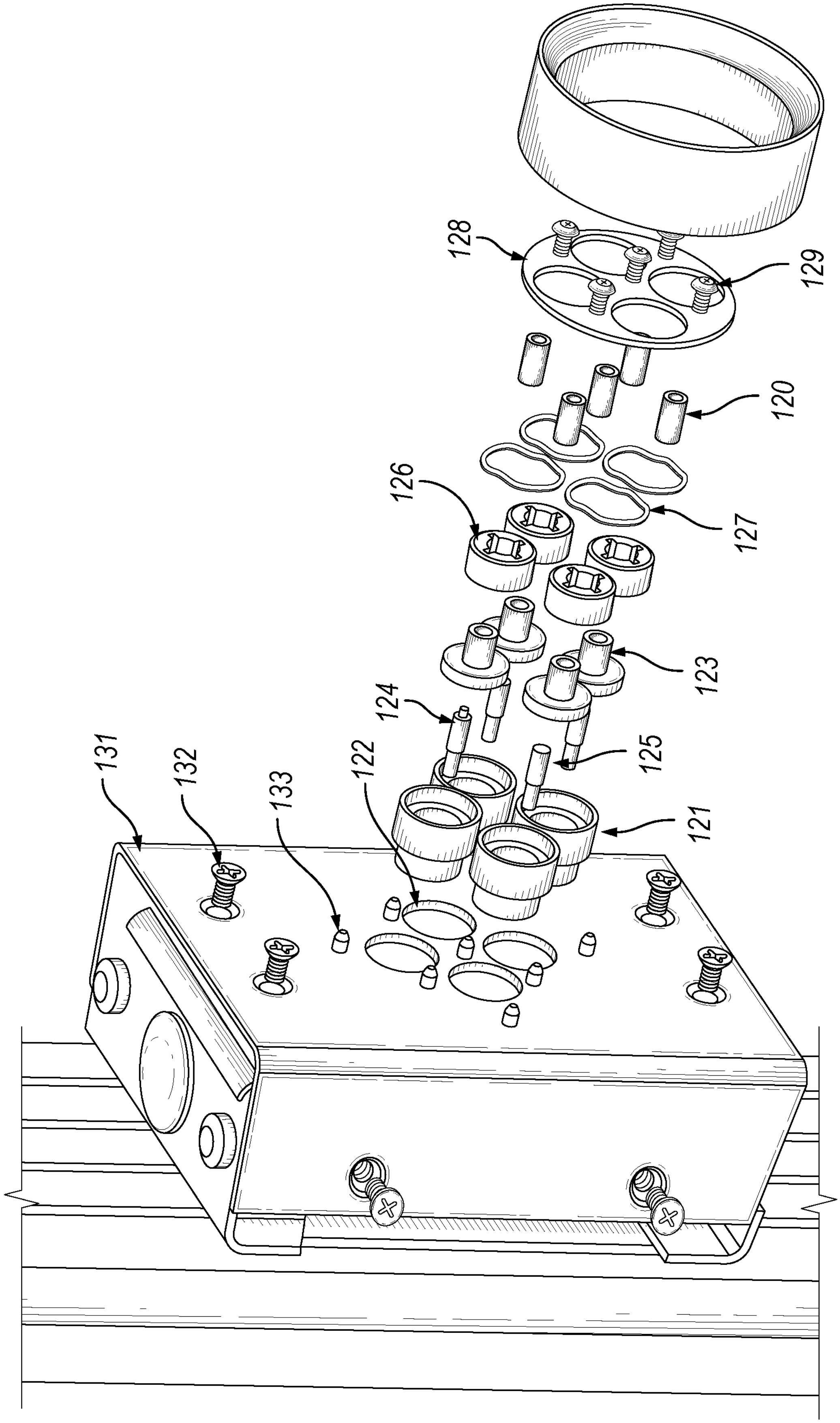
FIG. 8 illustrates an exploded isometric view of the example female connector in FIG. 1, in accordance with various embodiments.

FIG. 8 illustrates an exploded isometric view of the example female connector in FIG. 1, in accordance with various embodiments. This view illustrates spacers 120, magnetic contact outer housings 121, wires 122 (e.g., for the electrical signals), magnetic pin insulation discs 123, male contact pins 124, female contact pins 125, disk magnets 126, leaf springs 127, front disc 128 and fasteners 129.

Spacers 120 can be included and screwed two studs 133 on faceplate 131 to provide spacing between faceplate 131 and front disc 128. Fasteners 129 can be positioned through the small holes in front disc 128 and screwed into spacers 120 thereby holding the front disc 128 two faceplate 131 via spacers 120.

Pins 124, 125 are inserted through the center hole of insulation discs 123, which electrically insulate pins 124, 125 from magnets 126. Magnets 126 are positioned over the spindle on insulation discs 123, and the base of insulation discs 123 is disposed in the front opening of the magnetic contact outer housing. Electrical contact pins 124, 125 extend through insulation discs 123 such that the tip of contacts 124, 125 extends sufficiently for mating with corresponding contacts in the mating connector. Leaf springs 127 provide spring pressure for magnets 126. Where contacts 124, 125 are fixedly mounted within magnets 126, this also provides spring pressure for contacts 124, 125. Contacts 124, 125 may be separately spring-loaded. Screws 132 can be used to hold faceplate 131 onto the mounting box. Although leaf springs are illustrated, in other embodiments compression springs, torsion springs or other springs may be provided to provide a force to keep the contacts from physical contact absent the magnetic field.

In various embodiments, male contact pins 124, female contact pins 125 cylindrical magnets 126 are pressed into the magnetic pin insulation disk 123. These parts can be friction fit or assembled with an adhesive. The sub-assembled units (124 & 126 & 123, and 125 & 126 & 123) may then be pressed (with or without adhesive) into magnetic contact outer housings (121). These sub-assembled male and female contacts (124 & 126 & 123 & 121, and 125 & 126 & 123 & 121) are housed between the backplate and front disc 128 with a spacers 120 and fasteners 118. The base 119 front disc 128 spacers 120 allow for the sub-assembled male and female contacts to float in all directions. The leaf springs 127 provide male and female contact sub-assembled housings axial compressive force. This compressive force is overcome by sufficient strength of the magnetic force applied to achieve connector mating. This is one way to reduce and meter the connector mating force.

Indicator lights and control buttons can be included, and in the example of FIG. 8 are illustrated at the top of the connector box. Indicator lights may display, for example, connection status, operational status of the connector, and so on. A button can be included to, for example, interrupt power to the electromagnets (where electromagnets are used) for easier disconnection of the connector or to energize electromagnets for connection. Other control mechanisms to control the connector may also be used including, for example, computerized control through an application via a wireless or wired interface.

Figure 9:
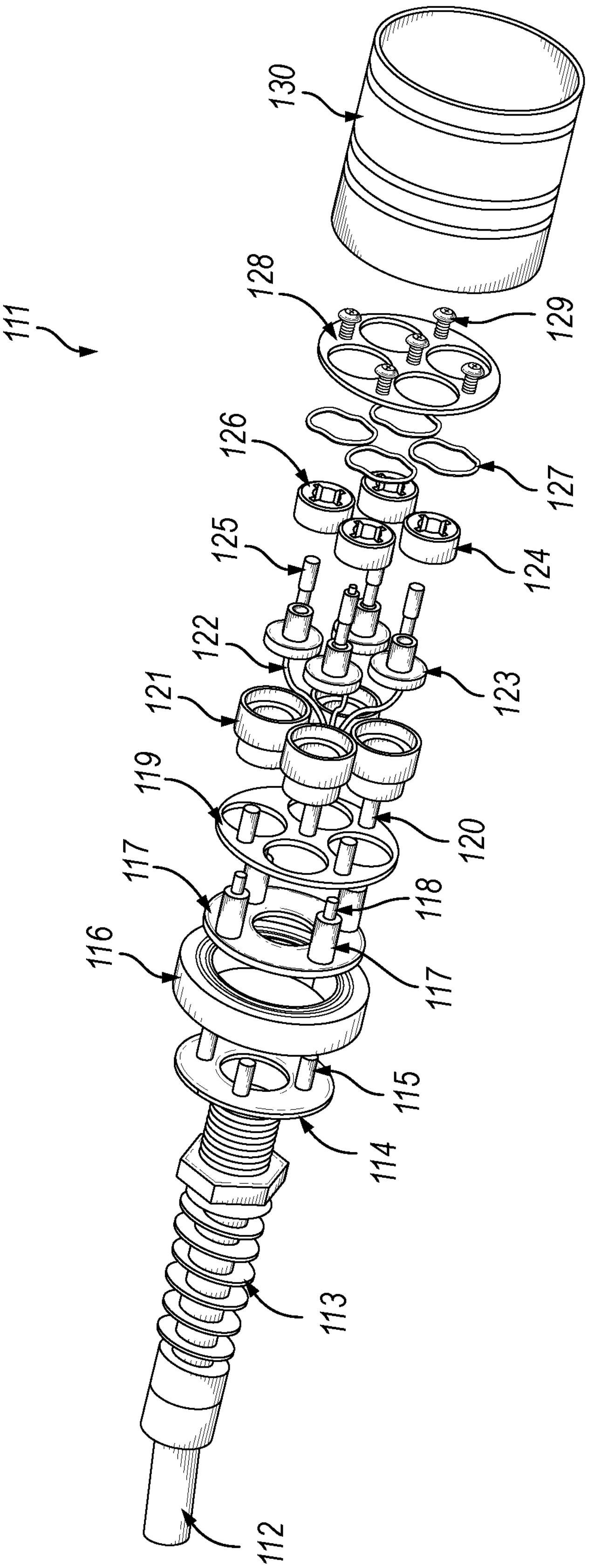
FIG. 9 illustrates an exploded isometric view of the example male connector in FIG. 1, in accordance with various embodiments.

FIG. 9 illustrates an exploded isometric view of the example male connector in FIG. 1, in accordance with various embodiments. This view illustrates a cable 112 with four conductive wires 122 and a cable strain relief boot 113. The wires are not shown as being connected to cable 112 for clarity of illustration. This view also illustrates a rear disc 114, rear fasteners 115, a ball bearing assembly 116, a bearing disc 117, bearing fasteners 118, a magnet array base disc 119, spacers 120, magnetic contact outer housings 121, pin insulation discs 123, male contact pins 124, female contact pins 125, disk magnets 126, leaf springs 127, front disc 128, fasteners 129 and male outer connector housing 130.

Fasteners 129 are used to fasten front disc 128 via spacers 120 to the bearing disc 117 at bearing fasteners 118. Magnets 126 are positioned over the spindle on insulation discs 123, and the base of insulation discs 123 is disposed in the front opening of the magnetic contact outer housing 121. Electrical contact pins 124, 125 extend through insulation discs 123 such that the tip of contacts 124, 125 extends sufficiently for mating with corresponding contacts in the mating connector. Leaf springs 127 provide spring pressure for magnets 126. Where contacts 124, 125 are fixedly mounted within magnets 126, this also provides spring pressure for contacts 124, 125.

In various embodiments, male contact pins 124, female contact pins 125 and cylindrical magnets 126 are pressed into the magnetic pin insulation disk 123. These parts can be friction fit or assembled with an adhesive. The sub-assembled units (124 & 126 & 123, and 125 & 126 & 123) may then be pressed (with or without adhesive) into magnetic contact outer housings (121). These sub-assembled male and female contacts (124 & 126 & 123 & 121, and 125 & 126 & 123 & 121) are housed between the magnetic array base disc 119 and front disc 128 with a spacers 120 and fasteners 118. The base 119 front disc 128 spacers 120 allow for the sub-assembled male and female contacts to float in all directions. The leaf springs 127 provide male and female contact sub-assembled housings axial compressive force. This compressive force is overcome by sufficient strength of the magnetic force applied to achieve connector mating. This is one way to reduce and meter the connector mating force.

As noted above, embodiments may use electromagnets to implement some or all of the magnets used to align and mate the connectors. Using magnets, including magnets with programmable polarities, can provide flexibility to connector configurations. Embodiments may be implemented in which corresponding contact pairs in the two connector bodies are energized with opposite polarities such that when the connectors are brought together, the inner body rotates and the corresponding pairs are aligned for connection. Other embodiments can be implemented in which the connector halves are physically mated but the electrical contacts within are not mated until the appropriate electromagnet configuration is initiated. For example, the electromagnets can be configured in a first mode to all have the same polarity in one connector half and that same polarity and a second connector half such that when the connector halves are brought together, electrical contacts are repelling one another and no electrical connection is made. Once aligned, activating an opposite polarity in a chosen connector pair (or set of connector pairs), and de-energizing the other pairs can cause the inner body of the connector(s) to rotate and cause the corresponding pins in the chosen male and female connector halves to extend via magnetic attraction and to connect. In this manner, the connectors can be aligned and an initial contact can be made with one pair of pins or a subset of pairs of pins. Then, as appropriate for the particular implementation, the magnets of other pin pairs can be energized with opposing polarities such that those pins make connection at the appropriate time. In this manner, the connector can be a fully programmable connector in which particular pins, or sets of pins can be programmed to engage or disengage in a desired order and at a desired time by controlling or modulating the polarity of the magnets surrounding or proximate to the pins.

As another example, instead of beginning the mating operation with all magnets of the both connector halves at the same priority, all pins can be deenergized, or all but a select pair or set of pairs can be deenergized for the initial coupling step. With embodiments utilizing springs to provide a mechanical force in a direction opposite the magnetic force, inadvertent contact of the pins can be avoided during initial connector mating even with all pins deenergized. Energizing a single connector pair, or set of connector pairs, in each body half during mating enables alignment and selective initial engagement of one connector pair or a set of connector pairs. As noted above, additional connector pairs can be energized and mated at the appropriate time and in the appropriate sequence.

In addition to magnets associated with the pins, fixed or programmable magnets can be included in the connector bodies independent of the pins to provide connector alignment even if all of the magnets of the pins are deenergized or programmed to avoid pin connections (e.g., with opposite polarities).

In various embodiments, modulation or other control of the electromagnets for pin contact coupling can be preprogrammed into a connector (e.g., as part of a startup sequence) or can be controlled via an external device such as the device associated with the connector, or an app or other computer control. A wired or wireless interface can be provided to program the connector or to otherwise provide control signals for selectively energizing the electromagnets in the proper sequence at the proper times.

Electronic identification mechanisms such as RFID tags or other electronic tags can also be used to provide electronic keying. This can be used, for example, to verify that the connector halves are appropriate for connection to one another. The RFID tags or other electronic devices can also be used to provide, for example, a connection sequence or a listing of pins that should be connected, and those that should not be connected, such as in embodiments that use controlled electromagnetics. Thus, upon connection, the devices can share data with one another and use this data to provide the proper electrical connections through their various contacts. This can allow the same or similar physical connectors to be used with different devices having different electrical properties or requirements. Thus, for example, different devices can couple to the same connector of a power supply and utilize different pin configurations, startup sequences, power specifications or other custom arrangements.

Automatically orienting magnetic connectors as described herein may be used in a variety of different applications from commercial, to military, to home use. Embodiments may be particularly suited to certain environments such as a medical environment where it is desired to have quick connections and disconnections of medical equipment and also desired to allow the operator to plug the equipment and quickly without having to worry about physically aligning the contacts. Connectors such as those described herein can be used to couple power, data, or other electrical signals among various pieces of equipment.

A self-aligning connector may include: an inner connector body portion comprising an array of pins and magnets; an outer connector body portion rotatably mounted to the inner connector body; wherein, upon mating the self-aligning connector to another corresponding connector, the inner connector body portion rotates within the outer connector body portion such that the array of pins and magnets align with corresponding pins and magnets in the other corresponding connector to make electrical connection therewith.

The magnets may comprise disc magnets with an axial opening and may be disposed about their corresponding pins with each pin extending at least partially through the axial opening of its corresponding magnet. At least the magnets and the pins may be spring loaded.

A bearing assembly may be included and disposed between the interbody connector portion and the outer body connector portion.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

The term “coupled” refers to direct or indirect joining, connecting, fastening, contacting or linking, and may refer to various forms of coupling such as physical, optical, electrical, fluidic, mechanical, chemical, magnetic, electromagnetic, optical, communicative or other coupling, or a combination of the foregoing. Where one form of coupling is specified, this does not imply that other forms of coupling are excluded. For example, one component physically coupled to another component may reference physical attachment of or contact between the two components (directly or indirectly), but does not exclude other forms of coupling between the components such as, for example, a communications link (e.g., an RF or optical link) also communicatively coupling the two components. Likewise, the various terms themselves are not intended to be mutually exclusive. For example, a fluidic coupling, magnetic coupling or a mechanical coupling, among others, may be a form of physical coupling.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term “including” should be read as meaning “including, without limitation” or the like; the term “example” is used to provide exemplary instances of the item in discussion, not an exhaustive or limiting list thereof; the terms “a” or “an” should be read as meaning “at least one,” “one or more” or the like; and adjectives such as “conventional,” “traditional,” “normal,” “standard,” “known” and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as “one or more,” “at least,” “but not limited to” or other like phrases in some instances shall not be read to mean that the narrower case is intended or required in instances where such broadening phrases may be absent. The use of the term “module” does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A self-aligning connector, comprising:
an outer connector body;
an inner connector body rotatably mounted within the outer connector body;
a plurality of electrical contacts arranged on a face of the inner connector body; and
a plurality of magnets arranged in a determined pattern on the face of the inner connector body;
wherein when mating the self-aligning connector to a corresponding connector that comprises a corresponding plurality of magnets in a determined pattern on its face, attractive and repulsive forces of the magnets on the face of the inner connector body and the face of the corresponding connector cause the inner connector body to rotate within the outer connector body to an orientation that aligns the electrical contacts on the face of the inner connector body with corresponding electrical contacts on the face of the corresponding connector.

2. The self-aligning connector of claim 1, wherein the plurality of magnets of the inner connector body are arranged in a determined pattern of outward facing north and south polarities and the magnets in the corresponding connector are arranged in the same determined pattern but with opposite polarities such that upon joining the self-aligning connector with the corresponding connector, attractive and repulsive forces between magnets of the inner connector body and the magnets of the corresponding connector cause the inner connector body to rotate within the outer connector body into a proper alignment orientation and draw the corresponding connector and the inner connector body together.

3. The self-aligning connector of claim 1, wherein the plurality of magnets on on the face of the inner connector body are cylindrically shaped and positioned to surround their corresponding electrical contacts on the face of the inner connector body.

4. The self-aligning connector of claim 1, wherein the plurality of electrical contacts on the face of the inner connector body comprise a convex or a concave outward facing surface and the corresponding electrical contacts on the face of the corresponding connector comprise an outward facing surface having a complementary shape.

5. The self-aligning connector of claim 1, wherein the plurality of electrical contacts on the face of the inner connector body are arranged in a circular pattern about the face of the inner connector body.

6. The self-aligning connector of claim 1, wherein the magnets comprise disc magnets with an axial opening and are disposed about their corresponding electrical contacts with each electrical contact extending at least partially through the axial opening of its corresponding magnet.

7. The self-aligning connector of claim 1, wherein plurality of magnets are arranged in an alternating pattern with the plurality of electrical contacts on the face of the inner connector body.

8. The self-aligning connector of claim 1, wherein at least the magnets and the electrical contacts are spring loaded.

9. The self-aligning connector of claim 1, wherein the magnets comprise electromagnets with controllable polarities and the magnets are spring loaded and mechanically coupled to their corresponding electrical contacts.

10. The self-aligning connector of claim 9, wherein the electromagnets in the self-aligning connector are initially at one polarity and the magnets in the corresponding connector are at an opposite polarity, such that the when the self-aligning connector and the corresponding connector are brought together, the magnets and their corresponding electrical contacts are repelling one another and no electrical connection is made.

11. The self-aligning connector of claim 1, further comprising a bearing assembly disposed between the inner connector body and the outer connector body.

12. A self aligning electrical connector, comprising:

a first connector body comprising:

an outer body portion;

an inner body portion rotatably mounted within the outer body portion;

a plurality of electrical contacts on a face of the inner body; and an array of a plurality of magnets on the face of the inner body portion arranged in a determined pattern with outward facing north and south polarities; and a second connector body, comprising;

an array of a plurality of magnets on a face of the second connector body arranged in a determined pattern of magnets with outward facing north and south polarities; and a plurality of electrical contacts on the face of the second connector body corresponding to the pattern of two or more electrical contacts on the face of the inner body portion of the first connector body;

wherein, when mating the first connector body and the second connector body, attractive and repulsive forces of the arrays of two or more magnets on the faces of the inner body portion and the second connector body and cause the inner body portion to rotate within the outer body portion to an orientation that aligns the electrical contacts on the face of the inner body portion with the electrical contacts on the face of the outer body portion.

13. The self aligning electrical connector of claim 12, wherein upon alignment, attractive forces of magnets of the plurality of magnets on the faces of the inner body portion and the second connector body mechanically couple the first connector body and the second connector body.

14. The self aligning electrical connector of claim 12, wherein the electrical contacts on the face of the inner body portion and the electrical contacts on the face of the outer body portion are gender-neutral electrical contacts.

15. The self aligning electrical connector of claim 12, wherein the plurality of magnets on the face of the inner connector body are cylindrically shaped and positioned to surround their corresponding electrical contacts on the face of the inner connector body.

16. The self aligning electrical connector of claim 12, wherein each of the plurality of magnets on the face of the inner body has a corresponding electrical contact of the electrical contacts on the face of the inner body and each magnet and its corresponding electrical contact is spring loaded.

17. The self aligning electrical connector of claim 16, wherein one or more of the magnets comprise electromagnets with controllable polarities and the electromagnets are mechanically coupled to their corresponding electrical contacts.

18. The self aligning electrical connector of claim 17, wherein the electromagnets in the first connector body are initially at one polarity that is opposite a polarity of electromagnets in the second connector body, such that when the first connector body and the second connector body are brought together, the magnets and their corresponding electrical contacts of the first connector body are repelling the magnets and connectors in the second connector body and no electrical contact is made between the first connector body and the second connector body.

19. The self aligning electrical connector of claim 17, wherein after the first connector body and the second connector body are brought together and activating an opposite polarity in electromagnets of one of the first connector body and the second connector body, attraction of the electromagnets causes the electromagnets of the inner body and their corresponding electrical contacts to align with the electromagnets of the outer body and their corresponding electrical contacts, and extend via magnetic attraction to connect.

20. The self aligning electrical connector of claim 17, wherein one or more electromagnets of the inner connector body and the corresponding connector are deenergized for initial coupling to avoid inadvertent contact of connector pins during connector mating.

* * * * *